June 22, 1937.  E. W. SMITH  2,084,964
STORAGE BATTERY PLATE
Filed April 13, 1935   2 Sheets-Sheet 1

WITNESS:

INVENTOR
Edward W. Smith
BY
Augustus B. Stoughton
ATTORNEY

Patented June 22, 1937

2,084,964

UNITED STATES PATENT OFFICE 2,084,964

STORAGE BATTERY PLATE

Edward W. Smith, Philadelphia, Pa., assignor to The Electric Storage Battery Company, Philadelphia, Pa., a corporation of New Jersey Application April 13, 1935, Serial No. 16,151

10 Claims. (Cl. 136—55)

The object of this invention is to provide a storage battery plate of lighter weight than those heretofore developed and of a design to more effectively retain the active material in the plate.

More specifically, my invention consists of a storage battery plate comprising, a grid of metallic material having conducting rods depending therefrom, a rigid perforated enclosing case of non-conducting acid-resisting material enclosing said grid and provided with a series of vertically-spaced horizontally-projecting ledges between the conducting rods, and active material in the spaces between said ledges and in contact with the conducting rods.

The novel features of the invention are shown in the accompanying drawings, in which.

Figures 1, 2:
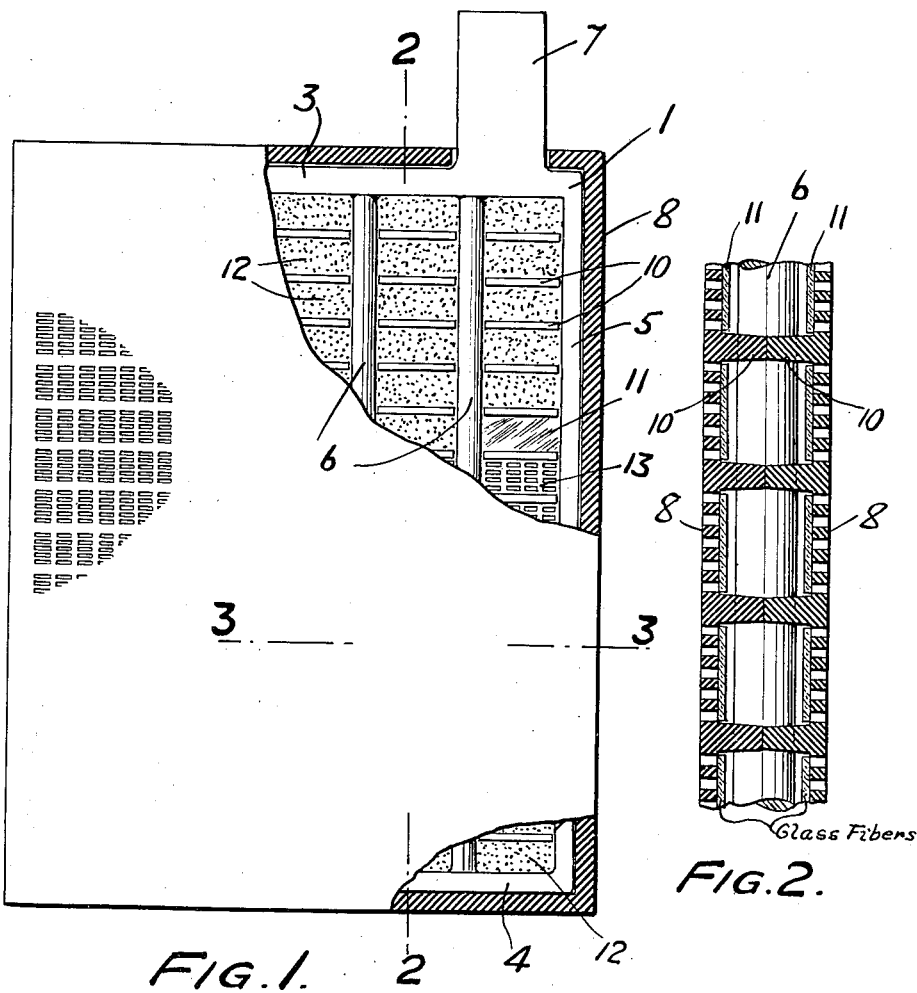
Fig. 1 is a side elevation of a plate involving features of the invention, portions of the plate structure being removed to disclose the internal construction.
Fig. 2 is a vertical section on the line 2—2 of Fig. 1 drawn to an enlarged scale.

Referring to Fig. 1, the plate structure comprises a frame or grid 1 of conductive material, such as lead-antimony alloy, provided with top and bottoms bars 3 and 4, vertical marginal bars 5 (only one of which is visible), and vertical conducting rods 6 extending from the top to the bottom bar. The entire grid structure is preferably made of a single piece. The grid is provided with a conducting lug 7. The grid is completely enclosed, except where the lug 7 projects, in a box-like case 8 made in two parts applied to opposite sides of the plate, each half of this case being provided with a marginal rim, these marginal rims meeting around the periphery of the grid to form a complete closure as shown at 9, in Fig. 3.

Each half of the enclosing case is provided with internal, horizontal, shelf-like projections 10 spaced vertically at suitable intervals from the top to the bottom of the plate and notched to receive the vertical bars 6 of the grid. As shown in Fig. 2, these shelves projecting from the opposite confronting faces of the case meet in the medial plane of the plate.

The case is made of non-conducting, acid-resisting material, such as hard rubber, and is perforated between the horizontal shelves in any suitable manner to provide access for the electrolyte and current to the active material of the plate. The perforations as shown in Fig. 1 are horizontal slots, but any other form of perforation may be used. The two halves of the case may be fastened together, as by cementing the abutting faces around the periphery, or in other ways.

The active material of the plate is disposed in the spaces between the confronting faces of the case and the horizontal shelves and surrounds, and is in contact with, the vertical bars 6 of the grid.

Between the active material and the inner faces of the case is shown a layer 11 of glass felt or glass wool which serves to retain the active material more permanently in the plate and also protects the surface of the case from the oxidation which would under some conditions occur if the active material (lead peroxide) of the positive plates were to come in contact with the case. This fibrous layer is not self-supporting but is very effective in retaining the active material in place. The rigid case has the double function of backing up the fibrous layer and also, by reason of its horizontal ledges, preventing the active material from dropping down.

In Fig. 1 portions of the case at the upper and lower right-hand corners of the plate have been removed together with the active material halfway through the plate, exposing the active material 12 of the other half. Also, at 11 the remaining active material has been removed, exposing the glass felt, while at 13 the layer of glass felt has been removed, exposing the further side of the case showing the perforations.

Figure 3:
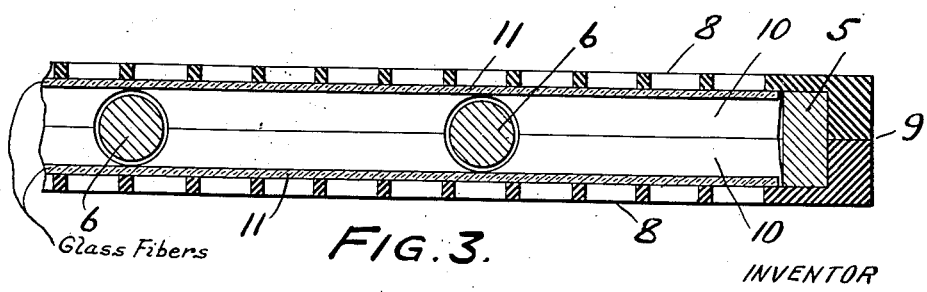
Fig. 3 is a horizontal section on the line 3—3 of Fig. 1 also drawn to an enlarged scale.
Figure 4:
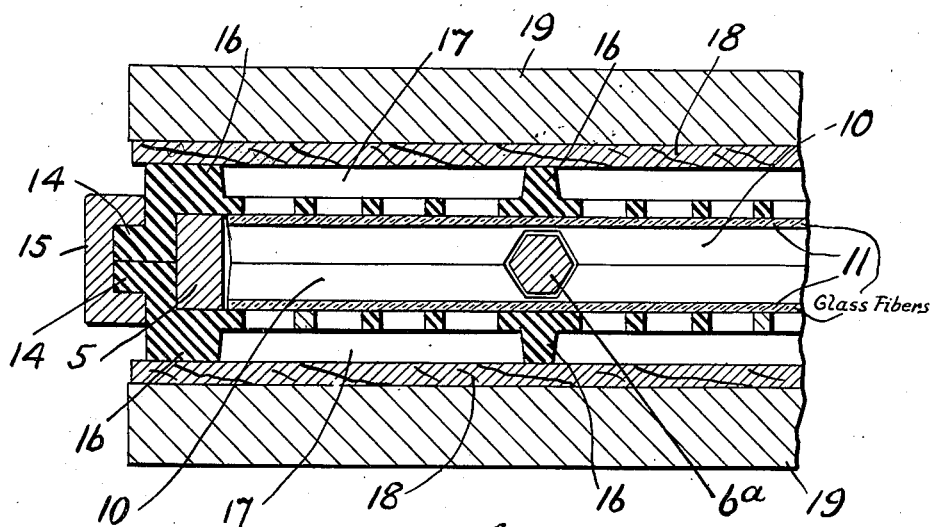
Fig. 4 is a horizontal section of a portion of a similar plate structure, showing certain modifications and including adjacent negative plates.

In Fig. 4, which is a horizontal section of a similar plate to enlarged scale, certain modifications of the design shown in Figs. 1, 2, and 3 are illustrated. The vertical edges of the case where the two halves meet are provided with rectangular projections 14, which may be clamped together in order to hold the two halves of the case in position by means of the channel-shaped strip 15. Other means for holding the two halves of the case may be employed which will readily suggest themselves to those skilled in the art. The active material itself will become partially embedded in the glass felt, holding this in position, and the glass felt may further be cemented to the inner surface of the case. Under some conditions, this cementing action may be sufficient to hold the two parts of the case together and, after the plates are assembled and wedged into place in the containers, there will be no tendency for the two halves to separate. Fig. 4 also shows the vertical rod 6a as hexagonal in section. Obviously any other suitable section may be employed.

In Fig. 4 vertical ribs 16 are shown on the outer surfaces of the case, providing channels 17 between the surfaces of the case and the diaphragm separators 18, which latter may be of wood or other suitable porous material. Negative plates 19 are shown in Fig. 4 lying adjacent to the diaphragm separators 18 on either side of the positive plate.

Figure 5:
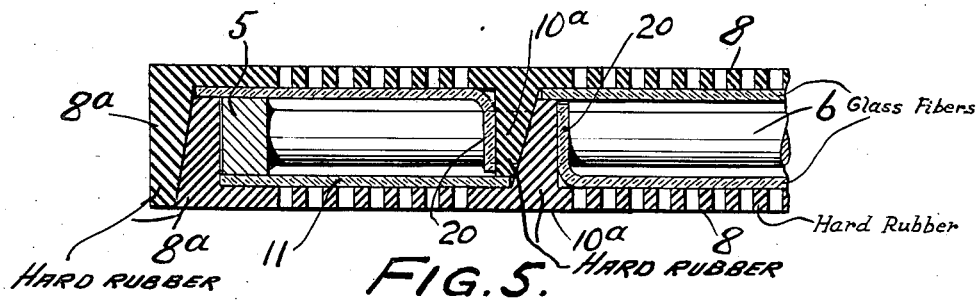
Figs. 5 and 6 are vertical sections of portions of a similar plate, showing other modifications.

In Fig. 5 a modification is shown, in which the shelf-like projections 10a, instead of abutting at the medial plane of the plate, overlap from the opposite sides and their contiguous faces may be cemented together. Similarly the peripheral marginal rims 8a of the two halves of the case overlap and may also be cemented together at their contiguous faces. Also, in Fig. 5, the edges of the glass felt sheets are turned up along the faces of the projections 10a, as at 20, to protect these faces from the oxidizing action of the active material.

Figure 6:
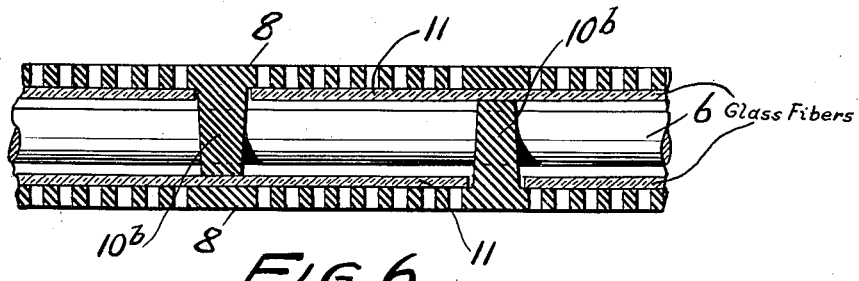

In Fig. 6 another modification is shown, in which the shelf-like projections 10b extend from the inner face of one side of the case over to the glass felt sheet on the other side, these projections being staggered alternately from the two halves of the case. These shelf-like projections, both in Fig. 5 and in Fig. 6, will be notched to receive the vertical bars 6 of the grid.

The construction described above presents a number of important advantages. In the commonly used design of storage battery plate, the grid structure comprises a series of vertical bars inter-connected by numerous horizontal ribs of the same material, the function of these horizontal ribs being to lock the active material in place. The horizontal shelf-like projections 10 in the present disclosure perform the same function, but are much lighter than the integral ribs made of the same metal as the grid. The glass felt sheets 11 act as an effective means for preventing the active material which may become softened during the life of the plate from escaping through the slots in the case.

In some cases, the side bars 5 of the conducting frame may be omitted and the bottom bar 4 may also be eliminated, these modifications being adapted to provide the maximum possible space for active material where this is of great importance.

The assembly of a plate of this design is comparatively simple. The glass felt strips are first applied to the inner surfaces of the two halves of the case, and the active material is then applied. The grid is then placed in position on one-half of the case and the other half is then applied under the necessary pressure to bring the contiguous faces together and unite the active material into one continuous body. After the active material has been allowed to set and dry, the plate is formed in the usual manner.

I do not intend to be limited save as the scope of the prior art and of the attached claims may require.

I claim:

1. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges having abutting ends between the conducting rods, and active material in the enclosed spaces between said ledges and in contact with the conducting rods.

2. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges between the conducting rods, active material in the enclosed spaces between said ledges and in contact with the conducting rods, and sheets of inert fibrous material between the active material and the inner surfaces of the case.

3. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges between the conducting rods and forming enclosed pockets, and vertical ribs projecting from the outside surfaces of the case.

4. A storage battery plate comprising, a grid of conducting metal having a horizontal top bar, conducting rods depending therefrom, and a rigid perforated enclosing case of non-conducting acid-resisting material enclosing said grid and provided with a series of vertically-spaced horizontally-projecting ledges meeting from opposite sides between the conducting rods and forming enclosed pockets.

5. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges meeting from opposite sides between the conducting rods to form enclosed pockets, and fastening means on the edges of said plate securing said case about said grid.

6. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges meeting from opposite sides between the conducting rods, and cement interposed between the abutting faces of said case at the edges of said plate and securing said case about said grid.

7. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges meeting from opposite sides between the conducting rods, projections extending from said case at the edges of said plate, and a channel-shaped strip abutting said projections and holding said case about said grid.

8. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges meeting from opposite sides between the conducting rods to form enclosed pockets, peripheral marginal rims on said case overlapping at the edges of said plate, and fastening means interposed between the abutting faces of said rims securing said case in position about said grid.

9. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges meeting from opposite sides between the conducting rods, active material in the enclosed spaces between said ledges and in contact with said conducting rods, and sheets of inert, fibrous material between said active material and the inner surfaces of said case and overlying said ledges.

10. A storage battery plate comprising, a grid of conducting metal having a horizontal top bar, conducting rods depending therefrom, a rigid perforated enclosing case of non-conducting acid-resisting material enclosing said grid and provided with a series of vertically-spaced horizontally-projecting ledges meeting from opposite sides between the conducting rods to form enclosed pockets, and sheets of inert fibrous material disposed on parts of the inner surfaces of said case and lying between said ledges.

EDWARD W. SMITH.